United States Patent
Cohen et al.

(10) Patent No.: US 8,250,408 B1
(45) Date of Patent: Aug. 21, 2012

(54) SYSTEM DIAGNOSIS

(75) Inventors: Ira Cohen, Sunnyvale, CA (US);
Chengdu Huang, Champaign, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1016 days.

(21) Appl. No.: 11/731,981

(22) Filed: Apr. 2, 2007

(51) Int. Cl.
*G06F 11/00* (2006.01)
(52) U.S. Cl. ........... 714/33; 714/25; 714/37; 714/48
(58) Field of Classification Search ........... 714/1–57, 714/25, 33, 37, 48; 375/229; 717/101; 710/33; 707/101
See application file for complete search history.

(56) References Cited

U.S. PATENT DOCUMENTS

| | | | |
|---|---|---|---|
| 7,502,971 B2 * | 3/2009 | Cohen et al. ............ | 714/45 |
| 2003/0014420 A1 * | 1/2003 | Jessee et al. ............ | 707/101 |
| 2006/0123156 A1 * | 6/2006 | Moir et al. ............ | 710/33 |
| 2006/0188011 A1 * | 8/2006 | Goldszmidt et al. ...... | 375/229 |
| 2006/0248503 A1 * | 11/2006 | Sabev .................. | 717/101 |
| 2007/0130572 A1 * | 6/2007 | Gilbert et al. .......... | 719/318 |
| 2007/0256018 A1 * | 11/2007 | Chatani et al. ......... | 715/733 |
| 2007/0276619 A1 * | 11/2007 | Sugahara et al. ........ | 702/82 |

OTHER PUBLICATIONS

Cohen, I. et al., "Correlating Instrumentation Data to System States: A Building Block for Automated Diagnosis and Control", Dec. 2004.

* cited by examiner

*Primary Examiner* — Scott Baderman
*Assistant Examiner* — Sarai Butler

(57) ABSTRACT

A method of automated diagnosis of a distributed system having a plurality of computing systems hosting replicated applications thereon is provided. The method includes deriving at least one diagnosis model correlating first metrics relating to a first application instance on a first one of the plurality of computing systems to a state of a system health indicator of the first application instance; determining whether the at least one diagnosis model is sufficiently accurate based on a probability of a predicted system health state of the first application instance given the first metrics and an actual system health state of the first application instance; and upon the determining that the at least one diagnosis model is sufficiently accurate, transferring the at least one diagnosis model to a second one of the plurality of computing systems for diagnosis of a second application instance on the second computing system that is a replicate of the first application instance.

20 Claims, 6 Drawing Sheets

SYSTEM DIAGNOSIS

BACKGROUND

The complexity of current computing systems and applications provided therein is quickly outgrowing the human ability to manage at an economic cost. For example, It is common to find data centers with thousands of host computing systems servicing hundreds to thousands of applications and components that provide web, computations and other services. In such distributed environments, diagnosis of failures and performance problems is an extremely difficult task for human operators. To facilitate diagnosis, commercial and open source management tools have been developed to measure and collect data from systems, networks and applications in the form of metrics and logs. However, with the large amounts of data collected, the operator is faced with the daunting task of manually going through the data, which is becoming unmanageable. These challenges have led researchers to propose the use of automated machine learning and statistical learning theory methods to aid with the detection, diagnosis and repair efforts of distributed systems and applications.

Current automated machine-learning approaches work well on small computing systems but do not scale to very large distributed environments with sizeable computing systems. There are two main difficulties of scaling up the learning approaches. First, with more components in a large distributed environment, there is a large increase in possible causes of failure and hence an increase in the data measurements, or metrics, that must be collected to pin-point them. This results in what is known as the "curse of dimensionality," a phenomenon in which current diagnosis methods exhibit a reduction in accuracy for a fixed-size training set, as the number of metrics increases. With more data required and with the increase in the number of metrics, most current learning methods can also become too computationally expensive with longer learning curves. A second difficulty lies in combining different types of data, such as low level system metrics, application metrics, and semi-structured data (e.g., text based log files). Various types of data have different statistical characteristics (e.g., following different statistical distributions) which challenge efforts to combine such data with existing learning methods.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
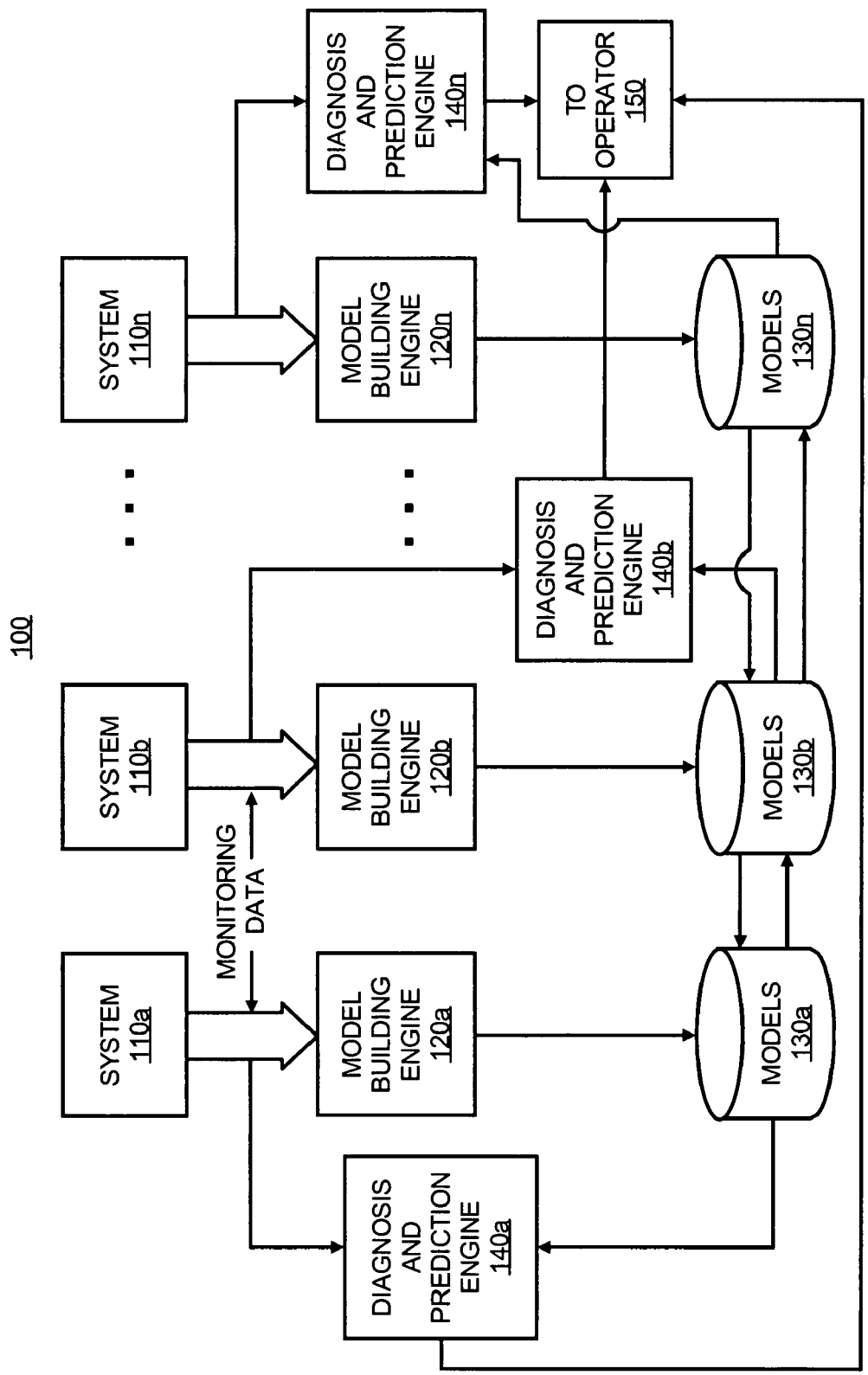
FIG. 1 illustrates a distributed environment or system wherein one or more embodiments may be practiced.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems that employ scalable machine-learning based techniques to diagnose performance problems in IT applications that are composed of multiple replicated instances, e.g., a distributed application load balanced or replicated across multiple IT data centers. Each application instance may contain multiple servers and components such as three-tier web services. Application instance replication is widely used in large scale distributed systems to improve throughput, reliability, and dependability.

According to one embodiment, a diagnosis task is provided to automatically point to the set of most indicative internal symptoms related to a given externally observed unhealthy indicator or performance problem, which is defined through a state of a system health indicator, such as a violation of a service lever objective (SLO). These internal symptoms are a subset of continuously monitored data that include, for example, system metrics, application metrics and event logs collected, that can point to the explanation of the performance problem. This automated diagnosis is achieved through learning probabilistic classifier models capturing the correlation between the monitored metrics and the system health state, such as the SLO state. One type of such learning probabilistic models is described in U.S. Patent Application Publication No. 2006/0188011(hereinafter, "Publication PAP-011"), with publication date of Aug. 24, 2006 of U.S. patent application Ser. No. 10/987,611, filed Nov. 12, 2004, which is herein incorporated by reference in its entirety. Alternative embodiments are contemplated wherein other types of models for correlating monitored metrics and the system health state are applicable as well.

As referred herein, a system health indicator provides a status or state of a condition of the system in accordance with one or more predetermined acceptable thresholds. A system health indicator may have one or more states to indicate different levels of system health. An example of a system health indicator is a SLO, which is typically found in a service level agreement (SLA). A system SLO may have two states, compliance and violation to indicate whether such a SLO has been complied or violated in the system. As with any other system health indicator, the SLO may have more than two states to indicate different levels of system health, such as violation, 50% compliance, full compliance, etc. Throughout the present disclosure, discussions are made using the SLO with two states, compliance and violation, as an example. However, it should be understood that those discussions are applicable to any other system health indicator with one or more states.

According to another embodiment, automated diagnosis techniques are provided that scale well to large-scale distributed systems containing many diagnostic information sources and replicated application or service instances. In one embodiment, wide-ranging metrics of different types (including both structured and semi-structured metrics) are divided into smaller bounded partitions to reduce learning overhead based on their semantics. The problem of identifying a temporal segmentation problem when a set of metrics from one source contains no diagnostic information for a given segment of the trace is also addressed, wherein the inapplicability of metrics from a source on parts of the trace is detected by the existence of accurate models from other sources. This significantly improves learning accuracy and reduces overhead. In addition, the similarities between replicated application instances are leveraged to enable transfers of learning techniques between systems hosting such instances, whereby models trained on one instance may be used on others. This enables further improvement in accuracy as well as leveraging existing diagnosis knowledge efficiently.

System

FIG. 1 illustrates a block diagram of an information technology (IT) distributed environment or system 100 wherein an embodiment may be practiced. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users.

The IT distributed environment 100 includes a plurality of computing systems 110$a$-$n$ operable to provide replicated application instances for improved throughput, reliability and dependability. As referred herein, an application includes one or more computing or IT tasks, services or a combination thereof. An application may run on or be executed by a computing system, such as a computer or any other computing or processing devices. Accordingly, an application instance refers to a single running or execution of the application. Thus, an application instance may include one or more computing machines that host, implement, or execute a copy of the application. Therefore, replicated instances of an application refers to multiple runnings or executions of the same application on one or more computing systems.

Each of the computing systems 110$a$-$n$ includes one or more computing machines, each computing machine hosting one or more software applications or components. Examples of computing systems include but are not limited to web servers, application servers, database servers. Thus, for example, a web search engine may employ a distributed system that includes multiple computing systems 110$a$-$n$, each having one or more web servers networked together to host a search engine website, one or more multiple application servers networked together to implement the search engine, and one or more database servers networked together to store search results obtained by the search engine. Each of the web servers hosts an instance of the search engine website, each application server runs an instance of the search engine application, and each of the database servers runs an instance of data storage to store different copies of search results so as to accommodate high traffic at the search engine website. The computing systems 110$a$-$n$ are instrumented to measure a wide range of metrics relating to applications hosted thereon, including the collection of various kinds of performance measurements and event logs, and to monitor the service SLO state in a manner known in the art. For example, commercially available data collection tools such as OpenView software by Hewlett Packard® Company and Microsoft NT 4.0 Performance Counters by Microsoft® may be used to monitor the computing systems 110$a$-$n$.

As referred herein, metrics measured of an application instance hosted on one of the computing systems 110$a$-$n$ are any measurements that are obtainable from the hardware and software therein, for example, an operating system, middleware or applications, running on such a computing system to implement the application instance. Examples of such metrics include: system-level metrics, such as resource utilization measures (e.g., CPU utilization) from both the application and database tiers; application-level performance data, such as volume, response time, and failure counts for each application transaction and sub-transaction, aggregated over windows of a predetermined time period (e.g., 5-minute time windows); and application event and error logs. From these metrics, SLOs may be defined.

As referred herein, the SLOs define acceptable thresholds on performance metrics or attributes relating to an application instance, such as average transaction response times, the maximum number of allowable transaction failures in a given window of time, percentile of transactions below a response time, throughput specifications, or any combination of such metrics. There are two SLO measurement states, compliance and violation. An SLO compliance occurs when a computing system meets an SLO. SLO violation occurs when a computing system fails to meet an SLO. Thus, SLO measurements for a distributed application act as heath indicators of such an application, and they may be predetermined or preset by system operators or users.

The IT distributed environment 100 further includes a model building engine (120$a$-$n$), a diagnosis and prediction (D&P) engine (140$a$-$n$), and a models database (130$a$-$n$) for each computing system (110$a$-$n$). Each model building engine (120$a$-$n$) is operable to generate probabilistic classifier models (hereinafter, "models") that correlate monitored metrics of each corresponding computing system (110$a$-$n$) as described earlier. Each D&P engine (140$a$-$n$) is operable to perform metric attribution for each SLO violation epoch as described later. Each models database (130$a$-$n$) is operable to store the models generated by a model building engine (120$a$-$n$) for a corresponding computing system (110$a$-$n$) and to receive models generated from other model building engines.

Figure 2:
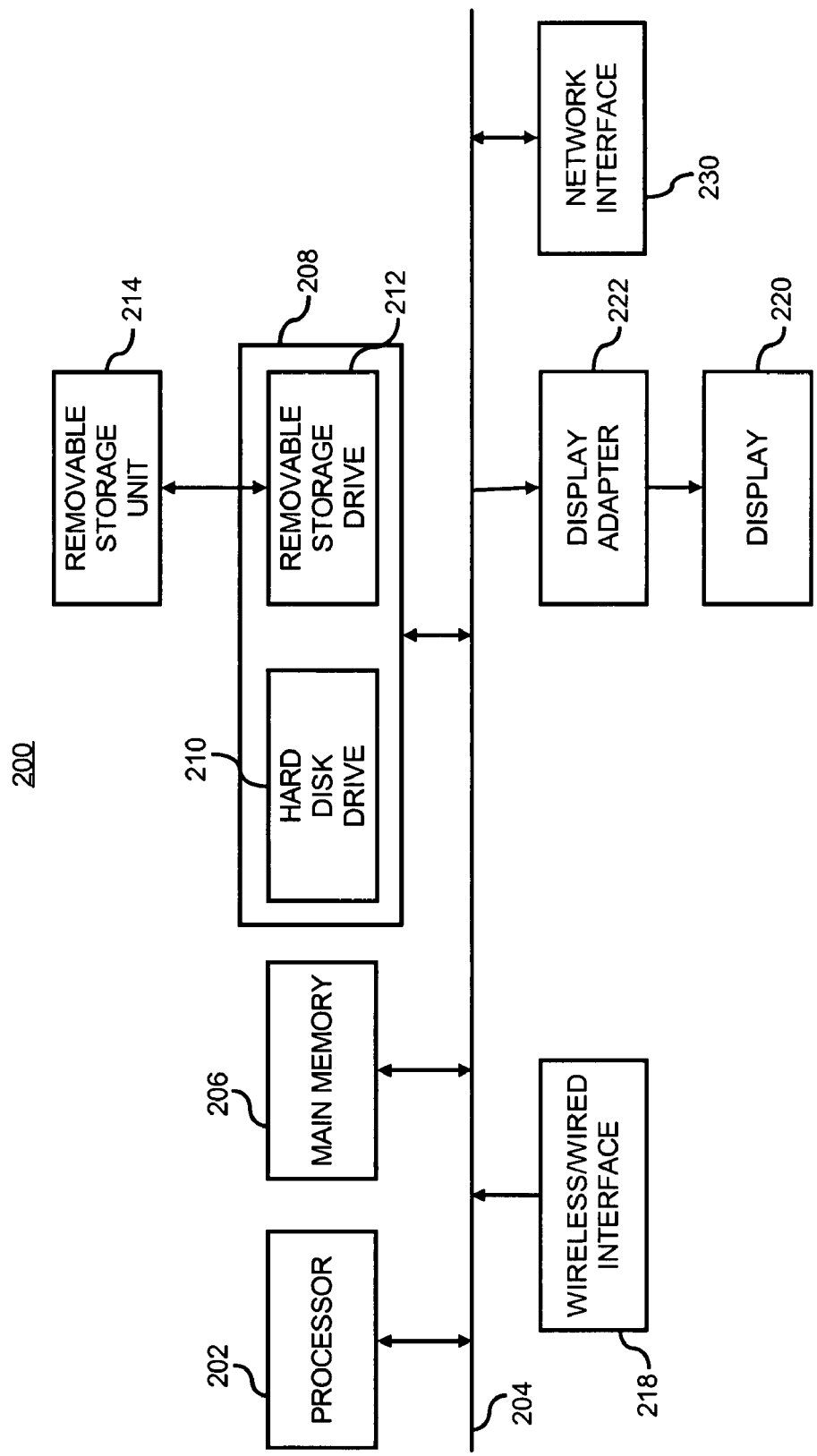
FIG. 2 illustrates a block diagram of a computerized system wherein one or more system components of a distributed environment may be practiced, in accordance with one embodiment.

FIG. 2 illustrates a block diagram of a computerized system 200 that is operable to be used as a platform for implementing each of the model building engines 120$a$-$n$, each of the models databases 130$a$-$n$, and each of the D&P engines 140$a$-$n$. Alternatively, the computerized system 200 is operable as a platform for implementing the model building engine 120$a$, the D&P engine 140$a$, the models database 130$a$, or any combination thereof for each computing system 110$a$.

The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200. The computer system 200 also includes a main memory 206 where software is resident during runtime, and a secondary memory 208. The secondary memory 208 may also be a computer-readable medium (CRM) that may be used to store software programs, applications, or modules that implement the methods 300 and 400, or parts thereof. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

According to one embodiment, the solution is to analyze different sources of data, such as application metrics, event logs (e.g., application errors, security, network), etc. Thus, when more software components (such as additional database servers) are added, more data sources from the added components are incorporated to maintain accurate diagnosis. As the number of sources of data increases, so does the number of metrics. To enjoy the benefits of treating each source independently, while taking the best advantage of the different sources, a multi-source temporal segmentation scheme is provided, wherein the metrics are first partitioned based on knowledge of topology of the computing systems and components therein and metric types. The partitioning yields multiple metric partitions, e.g., system metrics, application metrics, and event logs, each partition having a bounded number of metrics.

In another embodiment, a process is employed to automatically build an ensemble of probabilistic models on each metric partition and monitored SLO state. Each ensemble maintains a training window which is a continuous time sequence of training samples (measurements of the metrics). When a new training sample is received, it is taken into the current training window. If the current training window contains enough samples of both flagged as SLO compliance and SLO violation, a greedy selection algorithm is performed to pick the subset of metrics that is most relevant to modeling the SLO, and induce a new probabilistic model to capture the correlations between the subset of metrics selected and the SLO state. Metric partitions that successfully generate sufficiently accurate new models are operable to instruct or prompt other metric partitions to reset their training windows, keep their old training windows and start new training windows, to phase out older samples, or to perform any other desire scheme so as not to continue to just use the same old training windows. This helps the ensembles to better divide the continuous metric measurements into training windows to facilitate the generation of accurate models. Furthermore, transfer learning techniques are applied by exporting the ensembles using the same metric partitions of an application instance running on a first computing system, e.g., 110a, to a second computing system, e.g., 110b, so that they may be employed on the replicated application instance that runs on the second computing system.

Figure 3A:
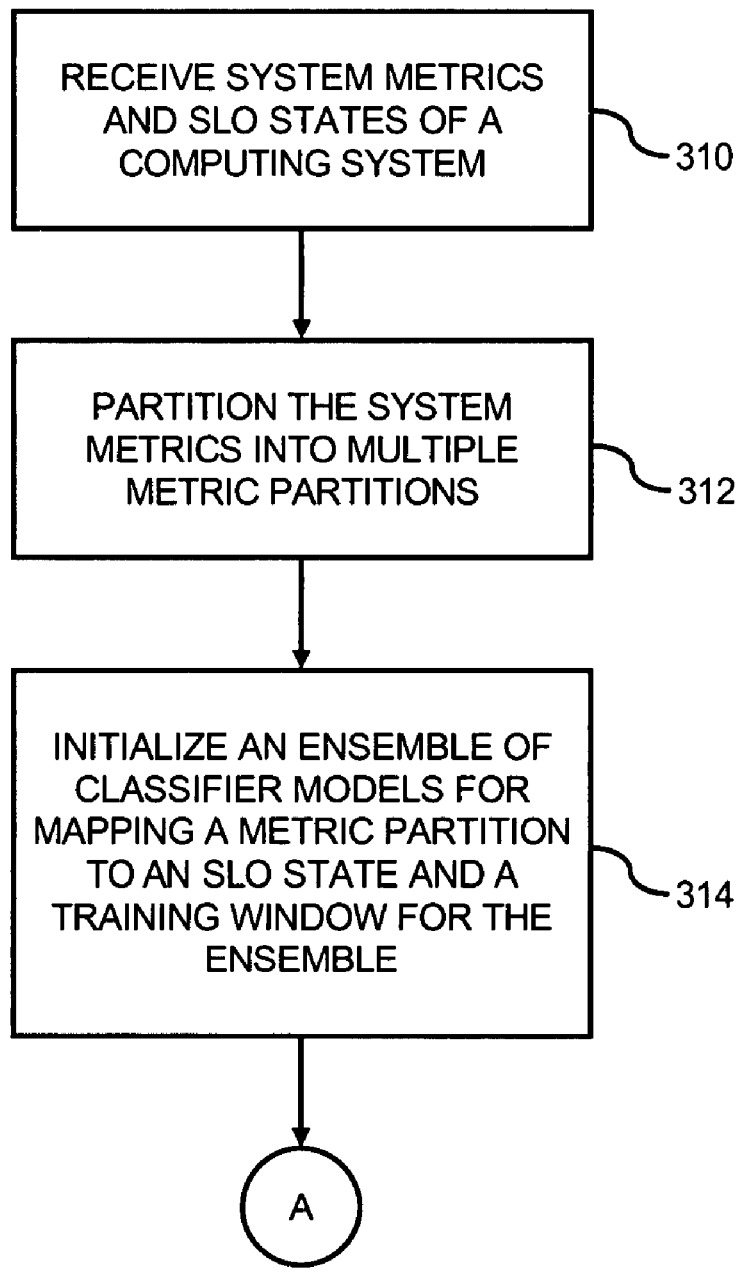
FIGS. 3A-C illustrate a method for automatically building an ensemble of models on each metric partition and monitored SLO state, in accordance with one embodiment.
Figure 3B:
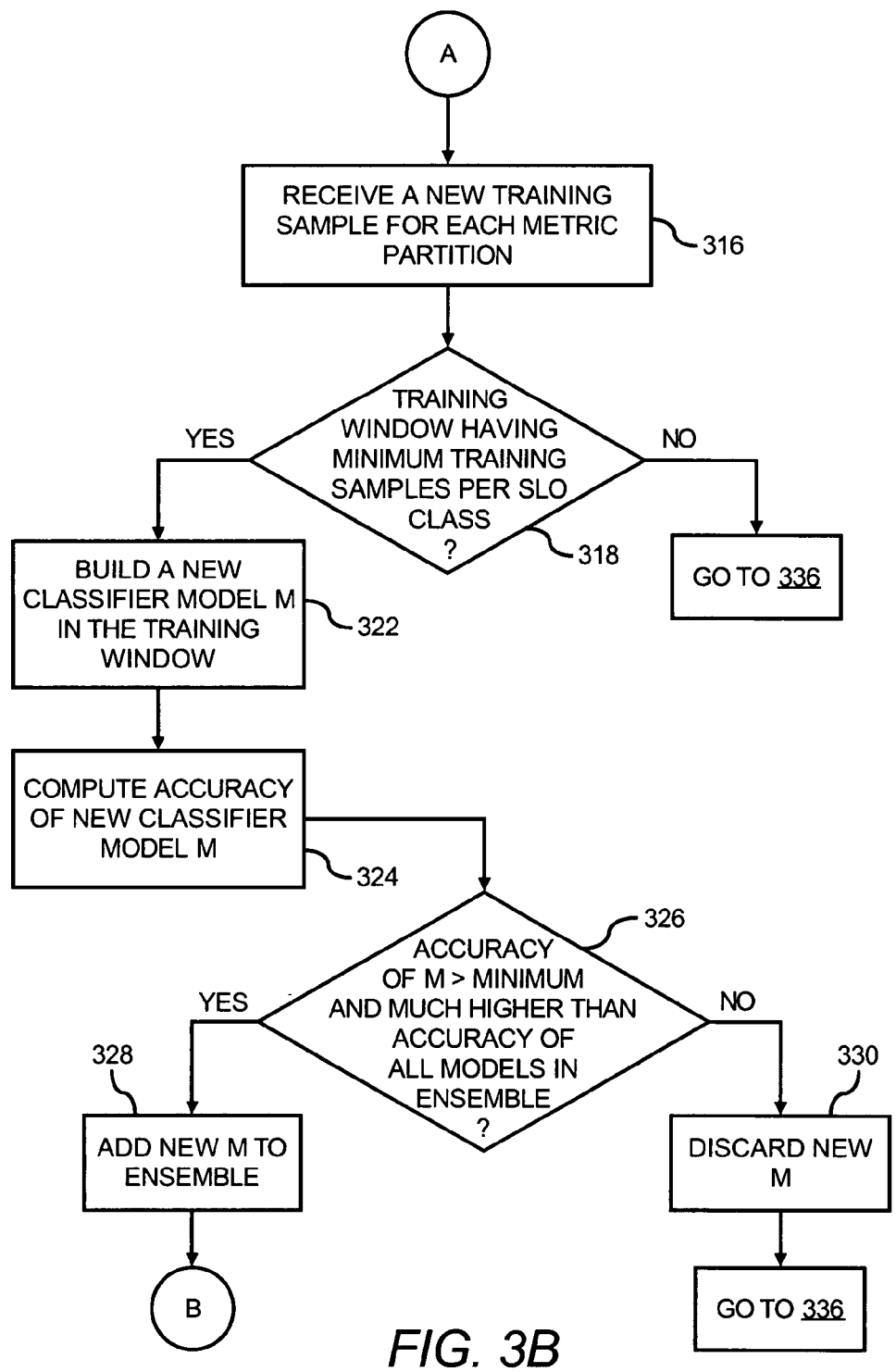
Figure 3C:
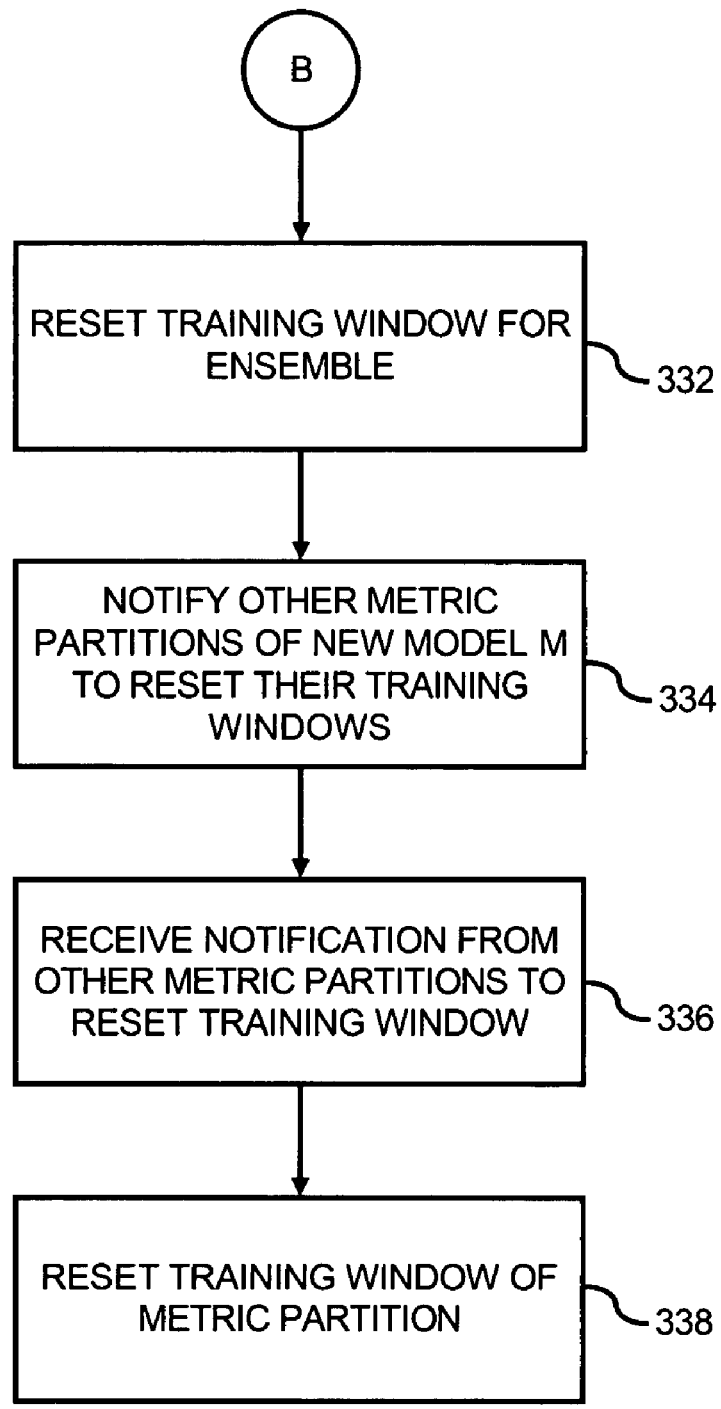

FIGS. 3A-C illustrate a flowchart diagram of a method 300 for automatically building an ensemble of models on each metric partition and monitored SLO state that scales well to large-scale distributed systems containing many diagnostic information sources and replicated application or service instances. For replicating service or application instances, transfer learning techniques are applied to take advantage of the similarities in the replicating instances to allow models trained on one instance to be used on others. This enables further improvement in accuracy and leveraging of existing diagnostic knowledge efficiently. For illustrative purposes only and not to be limiting thereof, the method 300 is discussed in the context of the distributed environment or system 100 illustrated in FIG. 1. Also, for simplification purposes, some portions of the method 300 is discussed in the context of the computing system 110a, its corresponding model building engine 120a and its D&P engine 140a. However, it should be understood that such a discussion is also applicable to the other computing systems 110b-n and their corresponding model building engines 120b-n and D&P engines 140b-n.

At 310, predetermined system metrics and SLO states (compliance or violation) of each of the computing systems 110a-n are measured or monitored using any commercially available data collection tools, such as OpenView software available from Hewlett Packard® Company and Microsoft NT 4.0 Performance Counters available from Microsoft®. Thus, the monitored data of each computing system (110a-n) is a data log containing vectors $\vec{M}$ of values of the system metrics and the corresponding SLO state $S \in \{s^+, s^-\}$ (compliance or violation, respectively) of each computing system. For each regular time period or epoch (e.g., 5-minute intervals) there is a corresponding vector $\vec{M}$, each element $m_i$ of a vector $\vec{M}$ contains the value of a specific metric, and S contains a discrete value indicating whether the SLO of the computing system was violated during that particular epoch. The monitored data of a computing system 110a is received by a corresponding model building engine 120a and a corresponding D&P engine 130a.

At 312, as noted earlier, the model building engine 120a partitions the received system metrics based on knowledge of topology of the computing systems and components therein and metric types. The partitioning yields multiple metric partitions of metric types, e.g., system metrics, application metrics, and event logs, each partition having a bounded number of metrics. Thus, each of the vectors $\vec{M}$ of the computing system 110a is divided into multiple partitioned vectors $\vec{M}_P$, each including therein a subset of the system metrics of the computing system 110a.

At 314, the model building engine 120a initializes an ensemble of probabilistic classifier models for each metric partition $\vec{M}_P$ of the computing system 110a to a null or empty set $\{\Phi\}$, i.e., a set with zero elements. Each probabilistic classifier model in an ensemble identifies which low-level system properties are correlated to high-level SLO violations. Thus, each model is a function F that maps a metric partition $\vec{M}_P$ to an SLO state S. As noted earlier, each ensemble maintains a training window which is a continuous time sequence of a predetermined number of training samples for a corresponding metric partition $\vec{M}_P$. Thus, the model building engine 120a also initializes a training window for each ensemble to a null set $\{\Phi\}$ of training samples because the ensemble set is initially empty. As referred herein, each training sample contains a specific monitored value for each of the specific metrics in a metric partition $\vec{M}_P$ of a computing engine (110a-n). For Example, One of the Metric partitions $\vec{M}_P$ of the computing engine 110a may contain five system metric elements $m_1 \ldots m_5$. Thus, a training window for the metric partitions $\vec{M}_P$ may be initialized by designating two or more continuous time sequence of training samples, for example, three training samples at time t=10:05 AM, 10:10 AM, and 10:15 AM (for 5-minute intervals), wherein each of the three training samples includes specific monitored values for the partitioned metrics $m_1 \ldots m_5$ (and corresponding SLO state value) at each particular time t of the training sample.

At 316, the model building engine 120a receives a new training sample for the metric partition $\vec{M}_P$ (and corresponding SLO state value), which is then taken into the current training window.

At 318, the model building engine 120a determines whether the training window has a minimum number of training samples per each class $\{s^+, s^-\}$ of the SLO state S, which may be empirically predetermined. Typically, with most machine learning techniques, the size of the training set is incrementally increased and accuracy is measured on a fixed test set. The result are learning curves which show what is the minimum training data needed to achieve models that perform close to the maximum accuracy possible.

At 320, if the training window does not have a minimum number of training samples per class, the model building engine 120a proceeds directly to 236 in the process 300.

At 322, however, when the training window contains the minimum number of training samples per class, the model building engine 120a proceeds to build a new probabilistic classifier model in the training window. In one embodiment, the model building engine 120a builds each new probabilistic classifier model as a Naive Bayes model based on the training window and training samples available therein thus far in a manner as describe in Publication PAP-011, as herein incorporated by reference in its entirety.

At 324, the model building engine 120a proceeds to compute the accuracy of the new model. In one embodiment, the accuracy of models is measured by the balanced accuracy (BA) on the training window using, for example, tenfold cross-validation as described in "A study of cross-validation and bootstrap for accuracy estimation and model selection," (R. Kohavi, *International Joint Conference on Artificial Intelligence* (IJCAI), pp. 1137-1145, 1995). Specifically, BA is the average of the probability of correctly identifying compliance and probability of detecting a violation as described in Publication. PAP-011:

$$BA = \frac{1}{2} \times \left[ P(s^- = F(\vec{M}) \mid s^-) + P(s^+ = F(\vec{M}) \mid s^+) \right].$$

It should be noted that to achieve the maximal BA of 1.0, the probabilistic classifier model or function F must perfectly classify both SLO violation and compliance.

At 326, the model building engine 120a determines whether the new model has a high BA in capturing the SLO state and it is statistically more accurate than other existing models in the ensemble. The value for a high BA may be set as desired by the system operator or any other authorized user. In one embodiment, a high BA has a value of 0.9 or above.

At 328, If the new model has a high BA (e.g., equal to a greater than a predetermined BA threshold), and it is statistically significantly more accurate than the existing models in the ensemble (e.g., the BA difference between the new model and existing model is greater than a predetermined difference threshold), the new model is added to the ensemble. Otherwise, the new model is discarded at 330.

At 332, the model building engine 120a also resets its training window to a null or empty set $\{\Phi\}$, which is effectively starting a new training window. Alternative embodiments are contemplated wherein a new training window is started with an empty set $\{\Phi\}$ while maintaining the old training window. or a new training window is effectively started by phasing out older samples from the old training window. In other words, there may be overlapping training windows.

At 334, the model building engine 120a also notifies other metric partitions to also reset their training window (or start a new one as noted above) to a null or empty set $\{\Phi\}$ whether or not they have added new models to their ensembles.

At 336, the model building engine 120a proceeds to determine whether there is notification from any other metric partition to reset the training window to the null or empty set $\{\Phi\}$.

At 338, if there is any such notification, the model building engine 120a proceeds to reset the training windows maintained by all ensembles for all metric partitions in the computing system 120a. Otherwise, the method 300 is repeated at 316 to continue receiving new training samples to build up the training window and add more models to the ensemble.

The intuition behind the method 300 is to avoid model in-accuracies caused by training samples with which no metrics in a given metric partition are correlated. In the context of server clusters, when training a model based on a metric partition with bounded metrics therein, it is generally impossible to automatically discount SLO violation samples that do not affect this sample (i.e., for which no metrics of the metric partition are attributed). This is the temporal segmentation problem mentioned earlier. The effect of including these samples in a training window is that they can skew the estimated statistics of metrics that otherwise would capture other periods of violation, leading to no models, or inaccurate ones. According to the method 300, the message from a learner of a metric partition indicating that it found attributable metrics for a given training window indicates to the learners of the other metric partitions that the past epochs are of a problem that may not be captured by those metric partitions. Therefore, they require the collection of a new training window. It should be noted that the method 300 does not prohibit adding models from various data sources for roughly the same training window, as long as the models in these ensembles are sufficiently accurate enough. Indeed, the method 300 is operable to produce a combination of metrics from various metric partitions that are attributed at the same time.

The method 300 may be leveraged to provide scalable machine-learning based techniques to diagnose performance problems to accommodate replicated IT application or service instances, such as distributed applications load balanced or replicated across multiple IT data centers. Such a service or application instance replication is widely used in large scale distributed systems to improve throughput, reliability, and dependability. In one embodiment, transfer learning techniques as applied to low-level system metrics are applied at the high system level to take advantage of the similarities in the replicating application or service instances to allow models trained on one application instance to be used on others. This enables further improvement in accuracy as well as leveraging existing diagnostic knowledge efficiently.

Figure 4:
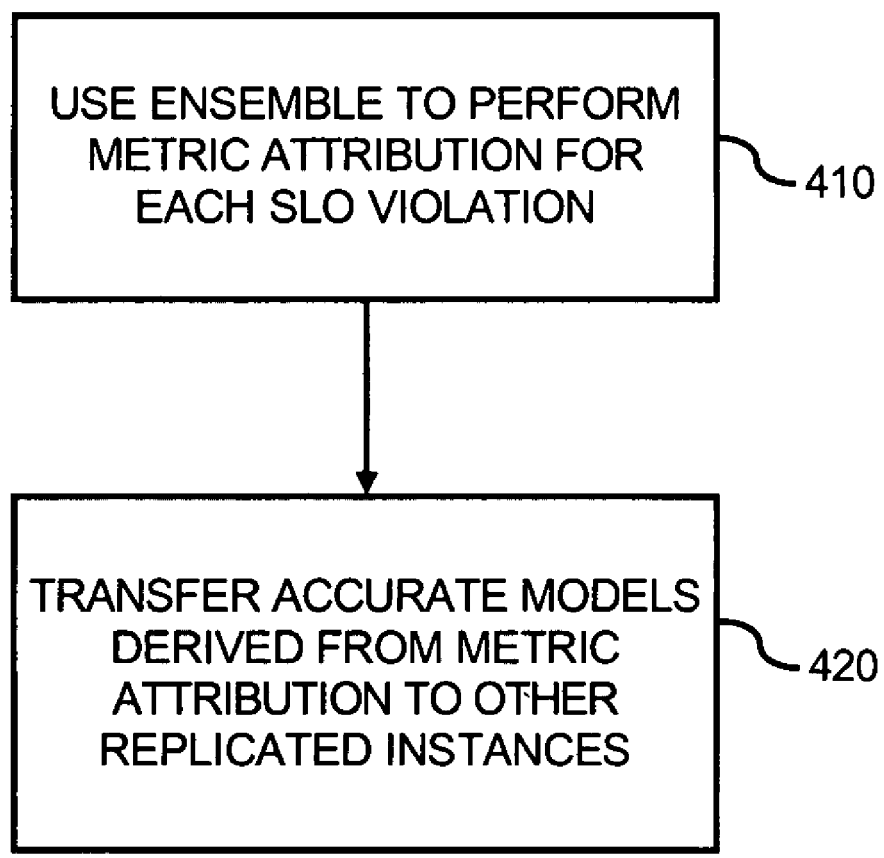
FIG. 4 illustrates a method for applying transfer learning techniques, in accordance with one embodiment.

FIG. 4 illustrates a flowchart diagram of a method 400 for applying transfer learning techniques to take advantage of the similarities in the replicating application instances to allow models trained on one application instance in one computing systems to be used on others in other computing systems. This enables further improvement in accuracy as well as leveraging existing diagnostic knowledge efficiently. For illustrative purposes only and not to be limiting thereof, the method 400 is discussed in the context of the distributed environment or system 100 illustrated in FIG. 1. The method 400 begins where the method 300 ends, with the use of the D&P engine 140a.

At 410, the D&P engine 140a uses the ensemble of models as built by the method 300 for each metric partition to perform metric attribution for each SLO violation epoch. As referred herein, metric attribution is a process that predicts from an ensemble of models which metrics (because of their values) are more likely to have been generated from their distribution during SLO violation periods. Thus, metric attribution is operable to identify a subset of metrics that are the most relevant to an SLO violation according to the ensemble of models. The D&P engine 140a performs metric attribution by first computing the model's Brier score (BS) for each model in the ensemble of a metric partition of each computing system 110a. As known in the art and described in, for example, "Verification of forecasts expressed in terms of probability" (G. Brier, Monthly Weather Review, Vol. 78, No. 1, pp. 1-3, 1950). The Brier score (BS) provides the mean squared error between a model's probability of a predicted SLO state given the current metrics and the actual SLO state. Specifically, for every model j in an ensemble, over a short window $D=\{d_{t-w}, \ldots, d_{t-1}\}$, of past data samples of a metric partition $\vec{M}_P$, where t is the present sample of data, making sure D includes samples of both SLO compliance and non-compliance:

$$BS_j(D) = \sum_{k=t-1}^{t-w} \left[ P(s^- \mid \vec{M} = \vec{m}_k; j) - I(s_k = s^-) \right]^2,$$

where $P(s^- \mid \vec{M} = \vec{m}_k; j)$ is the probability of the SLO state being in violation of model j given the vector of metric measurements and $I(s_k = s^-)$ is an indicator function, equal to 1 if the SLO state is $s^-$ and 0 otherwise, at time k. Second, The metric attributes from all models in the ensembles for all metric partitions are filtered by using only the most accurate models in terms of their Brier scores (e.g., meeting a minimum BS) on the most recent samples prior to a SLO violation. Similarly, for models transferred from other instances, they may be used for metric attribution when they have the highest Brier Scores out of all the models on the transferred instance. The subset of metrics as derived from these most accurate models are forwarded to the system operator 150 to allow the operator to focus on a small number of possible troubleshooting options.

At 420, the accurate models as derived from the metric attribution in 410 are transferred to the other models databases 130b-n for replicating applications or services in other computing system 110a-n. The transferred models may be then evaluated locally for metric attribution by the other D&P engines 140b-n. This transfer of models between different instances produces more accurate ensembles compared to the prior methods of simply learning ensembles on each instance, ignoring the similarities and dependencies that exist between the instances. Transferring models is a form of transfer learning. The intuition behind transfer learning theory is that it is possible to transfer what is learned about one classification problem to related ones. When transfer learning is possible, it reduces the amount of training examples a learner (e.g., a model building engine 130a) needs to observe to obtain accurate classifier models. For example, in the case of multiple instances of an internet service, the similarities are in the fact that the instances display similar behavior. Thus, transferring models between these instances reduces the amount of samples required to be seen on each instance of a particular problem. That is, if that problem was already previously observed on another instance and produced a model, it is directly and immediately applied.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of automated diagnosis of a distributed system having a plurality of computing systems hosting replicated applications thereon, comprising:
    deriving at least one diagnosis model correlating first metrics relating to a first application instance on a first one of the plurality of computing systems to a state of a system health indicator "system health state" of the first application instance;
    determining whether the at least one diagnosis model is sufficiently accurate based on a probability of a predicted system health state of the first application instance given the first metrics and an actual system health state of the first application instance; and
    upon the determining that the at least one diagnosis model is sufficiently accurate, transferring the at least one diagnosis model to a second one of the plurality of computing systems for diagnosis of a second application instance on the second computing system that is a replicate of the first application instance,
    wherein each of the plurality of computing systems is associated with a separate model building engine for deriving at least one diagnosis model.

2. The method of claim 1, wherein deriving the at least one diagnosis model comprises:
    receiving the first metrics and a corresponding system health state of the first application instance for each of a plurality of time periods;
    dividing the first metrics into multiple metric partitions, each of the metric partitions includes a subset of the first metrics received and the corresponding system health state; and
    building an ensemble of diagnosis models for each of the metric partitions based on the first metrics and the corresponding system health states received.

3. The method of claim 2, wherein building an ensemble of diagnosis models for each of the metric partitions comprises:
    initializing the ensemble and a training window for the ensemble, the training window is operable to include training samples of a first one of the metric partitions;
    receiving a new training sample of the first metric partitions into the training window;
    building a new diagnosis model; and
    adding the new diagnosis model to the ensemble based on predetermined criteria.

4. The method of claim 3, wherein building the new diagnosis model comprises:
    building the new diagnosis model for the ensemble in response to a determination that the training window includes a minimum number of training samples having a predetermined system health state.

5. The method of claim 3, further comprising:
    computing an accuracy of the new diagnosis model.

6. The method of claim 5, wherein adding the new diagnosis model to the ensemble based on predetermined criteria comprises:
adding the new diagnosis model to the ensemble in response to a determination that the computed accuracy of the new diagnosis model is greater than a predetermined threshold.

7. The method of claim 6, wherein adding the new diagnosis model to the ensemble is in response to an additional determination that the computed accuracy of the new diagnosis model is greater than any other diagnostic models in the ensemble.

8. The method of claim 5, wherein adding the new diagnosis model to the ensemble based on predetermined criteria comprises:
discarding the new diagnosis model in response to a determination that the computed accuracy of the new diagnosis model is greater than a predetermined threshold.

9. The method of claim 5, wherein adding the new diagnosis model to the ensemble based on predetermined criteria comprises:
discarding the new diagnosis model in response to a determination that the computed accuracy of the new diagnosis model is less than a predetermined threshold.

10. The method of claim 5, further comprising:
starting a new training window upon the adding of the new diagnosis model to the ensembles.

11. The method of claim 5, further comprising:
notifying other ones of the metric partitions to start training windows for their ensembles.

12. The method of claim 3, further comprising:
receiving notification from one of the metric partitions to start training windows for all of the metric partitions.

13. The method of claim 10, wherein starting a new training window comprises:
resetting the training window to an empty set to create the new training window upon the adding of the new diagnosis model to the ensembles.

14. The method of claim 10, wherein starting a new training window comprises:
starting another training window in addition to the training window upon the adding of the new diagnosis model to the ensembles.

15. The method of claim 10, wherein starting a new training window comprises:
phasing out at least one older ones of the training samples in the training window to create the new training window upon the adding of the new diagnosis model to the ensembles.

16. A distributed system with automated diagnosis thereof, comprising:
a plurality of computing systems, each hosting a replicated application instance;
a plurality of model building engines, each model building engine corresponding to a separate one of the plurality of computing systems, each of the plurality of model building engines operates to derive at least one diagnosis model for the corresponding one of the plurality of computing systems, the at least one diagnosis model provides correlation between metrics relating to the replicated application instance hosted on the corresponding one of the plurality of computing systems and a state of a system health indicator ("system health state") of the replicated application instance;
a plurality of diagnosis and prediction (D&P) engines, each D&P engine corresponding to a separate one of the plurality of computing systems, each of the D&P engines operates to determine an accuracy of the at least one diagnosis model built by a first one of the plurality of model building engines for use with a first replicated instance on the plurality of computing systems so as to transfer the at least one diagnosis model for use with a second one of the plurality of computing systems.

17. The distributed system of claim 16, wherein a first one of the model building engines is operable to:
receive first metrics and a corresponding system health state of a first replicated application instance hosted on the first computing system;
divide the first metrics into multiple metric partitions, each of the metric partitions includes a subset of the first metrics received and the corresponding system health state; and
build an ensemble of diagnosis models for each of the metric partitions based on the first metrics and the corresponding system health states received.

18. The distributed system of claim 16, wherein a first one of the D&P engines is operable to:
determine the accuracy of the at least one model by determining whether the at least one diagnosis model built by the first model building engine is sufficiently accurate based on a probability of a predicted system health state of a first replicated application instance for which the at least one diagnosis model was built, given the first metrics and an actual system health state of first replicated application instance; and
upon the determining that the at least one diagnosis model is sufficiently accurate, transfer the at least one diagnosis model to the second computing systems for diagnosis of a second application instance on the second computing system that is a replicate of the first application instance.

19. The distributed system of claim 16, wherein the system health indicator is a binary-state service level objective (SLO) having a compliance state to indicate compliance with the SLO and a violation state to indicate a violation of the SLO.

20. A non-transitory computer readable medium on which is encoded computer executable programming code that includes computer execution instructions to:
derive at least one diagnosis model correlating first metrics relating to a first application instance on a first one of the plurality of computing systems to a state of a system health indicator "system health state" of the first application instance;
determine whether the at least one diagnosis model is sufficiently accurate based on a probability of a predicted system health state of the first application instance given the first metrics and an actual system health state of the first application instance; and
upon the determining that the at least one diagnosis model is sufficiently accurate, transfer the at least one diagnosis model to a second one of the plurality of computing systems for diagnosis of a second application instance on the second computing system that is a replicate of the first application instance,
wherein each of the plurality of computing systems is associated with a separate model building engine for deriving at least one diagnosis model.

* * * * *